US010564180B2

(12) United States Patent
Hirade

(10) Patent No.: US 10,564,180 B2
(45) Date of Patent: Feb. 18, 2020

(54) SCANNING PROBE MICROSCOPE USING GRADUAL INCREASES AND DECREASES IN RELATIVE SPEED WHEN SHIFTING AND RECIPROCATING THE SCANNED PROBE ACROSS A SAMPLE

(71) Applicant: Shimadzu Corporation, Kyoto (JP)

(72) Inventor: Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 26 days.

(21) Appl. No.: 15/566,164

(22) PCT Filed: Apr. 14, 2015

(86) PCT No.: PCT/JP2015/061494
§ 371 (c)(1),
(2) Date: Oct. 12, 2017

(87) PCT Pub. No.: WO2016/166816
PCT Pub. Date: Oct. 20, 2016

(65) Prior Publication Data
US 2018/0088148 A1    Mar. 29, 2018

(51) Int. Cl.
*G01Q 10/04*    (2010.01)
*G01Q 10/06*    (2010.01)
*G01Q 20/02*    (2010.01)

(52) U.S. Cl.
CPC ............. *G01Q 10/04* (2013.01); *G01Q 10/06* (2013.01); *G01Q 20/02* (2013.01)

(58) Field of Classification Search
None
See application file for complete search history.

(56) References Cited

U.S. PATENT DOCUMENTS

| 5,831,961 | A | 11/1998 | Sakai et al. |
| 2001/0032496 | A1 | 10/2001 | Watanabe |
| 2004/0217270 | A1* | 11/2004 | Publicover ............. G01Q 10/06 250/234 |

(Continued)

FOREIGN PATENT DOCUMENTS

| JP | H8-235651 A | 9/1996 |
| JP | 2001-194284 A | 7/2001 |

(Continued)

OTHER PUBLICATIONS

International Search Report dated Jun. 30, 2015 of corresponding International application No. PCT/JP2015/061494; 5 pgs.

*Primary Examiner* — James Choi
(74) *Attorney, Agent, or Firm* — Maier & Maier, PLLC

(57) ABSTRACT

A scanning probe microscope capable of increasing a relative speed of a probe and making noise unlikely to occur in a measurement result for the surface shape of a sample. When a relative movement direction of the probe is switched at the time of reciprocation in an X direction and a direction opposite to the X direction, the relative speed is gradually decreased and then the direction is switched, and after the switching, the relative speed is gradually increased, to prevent a rapid change in the relative speed. At the time of shifting the probe in a Y direction and a direction opposite to the Y direction, the relative speed of the probe is gradually increased and then the relative speed is gradually decreased, to prevent a rapid change in the relative speed.

3 Claims, 13 Drawing Sheets

(56) References Cited

U.S. PATENT DOCUMENTS

| | | | |
|---|---|---|---|
| 2006/0174384 A1* | 8/2006 | Roessler | G01Q 30/04 250/306 |
| 2006/0219899 A1 | 10/2006 | Ohta | |
| 2008/0087820 A1* | 4/2008 | Kurenuma | B82Y 35/00 250/307 |
| 2009/0107222 A1* | 4/2009 | Abramovitch | G01Q 60/32 73/105 |
| 2012/0066799 A1* | 3/2012 | Esch | G01Q 10/06 850/1 |
| 2018/0120343 A1* | 5/2018 | Sakai | G01O 60/24 |

FOREIGN PATENT DOCUMENTS

| | | |
|---|---|---|
| JP | 2002-350318 A | 12/2002 |
| JP | 4432806 B2 | 1/2010 |
| JP | 2010-066077 A | 3/2010 |

* cited by examiner

US 10,564,180 B2

SCANNING PROBE MICROSCOPE USING GRADUAL INCREASES AND DECREASES IN RELATIVE SPEED WHEN SHIFTING AND RECIPROCATING THE SCANNED PROBE ACROSS A SAMPLE

TECHNICAL FIELD

The present invention relates to a scanning probe microscope for measuring the surface shape of a sample by relatively moving a probe along the surface of the sample.

BACKGROUND

In a scanning probe microscope, a probe is scanned by being relatively moved with respect to the surface of a sample placed on a stage in the XY-plane, to detect a change in physical quantity (tunneling current, interatomic force, or the like) that acts between the probe and the sample surface during the scanning. Then, the relative position of the probe in a Z direction is feedback-controlled so as to keep the physical quantity constant during the scanning. It is thereby possible to measure the surface shape of the sample based on a feedback amount (e.g., see Patent Document 1 below).

FIG. 8 is a schematic diagram for describing a conventional mode at the time of relatively moving the probe on the surface of the sample. FIGS. 9A and 9B are diagrams showing the relationship between the time and the relative position of the probe when the probe is relatively moved in the mode of FIG. 8. FIG. 9A shows a relative position of the probe in an X direction and FIG. 9B shows a relative position of the probe in a Y direction.

As shown in FIG. 8, at the time of relatively moving the probe on the surface of the sample, the following operations are alternately repeated: the operation of relatively moving the probe in the X direction (forward path) and the opposite direction (backward path) to the X direction to reciprocate the probe on one line; and the operation of relatively moving the probe by one pixel at a time in the Y direction to shift the probe. The physical quantity on each line during the reciprocation is thereby detected, and the feedback amount is adjusted using the physical quantity detected on each of the forward and backward paths.

As shown in FIG. 9A, the relative speed of the probe in the X direction is constant both on the forward and backward paths. That is, the probe, which starts being relatively moved in the X direction from a starting position P1, is relatively moved on the forward path at a fixed speed immediately after the start, and the relative movement direction is switched to the opposite direction at a return position P2. At this time, the probe is relatively moved on the backward path at a fixed speed immediately after switching of the relative movement direction, and the probe is returned to the starting position P1. In this manner, the relative movement direction of the probe, relatively moved at a fixed speed, is alternately switched to relatively reciprocate the probe on each line.

As shown in FIG. 9B, the probe is moved in the Y direction by one pixel every time the probe, reciprocated in the X direction and the opposite to the X direction, is returned to the starting position P1. The probe, which starts being relatively moved from the starting position P1 in the Y direction, is relatively moved at a fixed speed immediately after the start, and is stopped when relatively moved just by one pixel.

PRIOR ART DOCUMENT

Patent Document

Patent Document 1: Japanese Patent No. 4432806

SUMMARY OF THE INVENTION

In general, the relative speed (scanning speed) of the probe in the scanning probe microscope is slow and it takes several minutes to measure the surface shape of the entire sample. The scanning probe microscope has thus been desired to have a configuration capable of measuring the surface shape of the sample in a shorter period of time by increasing the relative speed of the probe.

However, when the relative speed of the probe is increased, noise is likely to occur in a measurement result for the surface shape of the sample at the starting position P1 and the return position P2, which has been problematic. This is conceivably caused by the discontinuity of the relative speed of the probe at the starting position P1 and the return position P2.

That is, concerning the relative movement of the probe in the X direction, the relative speed of the probe rapidly changes, since the probe is suddenly stopped relatively and at the same time starts being moved in the opposite direction at the starting position P1 and the return position P2. Also, concerning the relative movement of the probe in the Y direction, the relative speed of the probe rapidly changes at the starting position P1. It is conceivable that due to such a rapid change in the relative speed of the probe, vibration is likely to occur at the starting position P1 and the return position P2 with a resonance frequency of the stage, and periodic noise is thus likely to occur.

The present invention has been made in view of the above circumstances, and an object of the present invention is to provide a scanning probe microscope capable of increasing a relative speed of a probe and making noise unlikely to occur in a measurement result for the surface shape of a sample.

A scanning probe microscope according to the present invention includes a probe, a reciprocation control unit, a shifting control unit, and a measurement control unit. The probe is relatively moved along a surface of a sample. The reciprocation control unit relatively moves the probe in a first direction and a direction opposite to the first direction with respect to the surface of the sample, to reciprocate the probe. The shifting control unit relatively moves the probe in a second direction orthogonal to the first direction with respect to the surface of the sample, to shift the probe. The measurement control unit measures a surface shape of the sample based on a relative displacement amount of the probe in a direction orthogonal to the first direction and the second direction, the probe being relatively moved along the surface of the sample by the reciprocation control unit and the shifting control unit. When a relative movement direction of the probe is switched, the reciprocation control unit gradually decreases a relative speed and then switches the direction, and gradually increases the relative speed after the switching, to relatively reciprocate the probe. The shifting control unit gradually increases the relative speed of the probe and then gradually decreases the relative speed, to relatively shift the probe.

With such a configuration, it is possible to prevent the relative speed of the probe from becoming discontinuous when the relative movement direction of the probe is switched at the time of reciprocation or when the probe is shifted. That is, when the relative movement direction of the probe is switched at the time of reciprocation, it is possible to prevent a rapid change in the relative speed of the probe by gradually decreasing the relative speed and then switching a relative movement direction of the probe, and by gradually increasing the relative speed after the switching. Further, at the time of shifting, it is possible to prevent a rapid change in the relative speed of the probe by gradually increasing the relative speed of the probe and then gradually decreasing the relative speed. Since this can prevent generation of periodic noise even when the relative speed of the probe is increased, the relative speed of the probe can be increased and noise is unlikely to occur in a measurement result for the surface shape of the sample.

The reciprocation control unit may relatively move the probe at a fixed speed before gradually decreasing the relative speed of the probe.

With such a configuration, the surface shape of the sample can be accurately measured during relative movement of the probe at a fixed speed at the time of reciprocation. Therefore, even when the relative speed of the probe is increased, noise is unlikely to occur in the measurement result for the surface shape of the sample, and a highly accurate measurement result can be obtained.

The scanning probe microscope may further include a display unit. In this case, the measurement control unit may cause the display unit to display an uneven image of the sample surface based only on a measurement result that is obtained during relative movement of the probe at the fixed speed.

With such a configuration, it is possible to display an uneven image of the sample surface on the display unit based only on a highly accurate measurement result that is obtained during relative movement of the probe at the fixed speed.

The probe may be relatively moved at different positions on the surface of the sample before and after the relative movement direction is switched by the reciprocation control unit. In this case, by being reciprocated a plurality of times by the reciprocation control unit, the probe may be relatively moved at the same position on the sample surface along the first direction and the direction opposite to the first direction.

With such a configuration, the relative reciprocation of the probe is not continuously performed at the same position on the forward and backward paths but at different positions on the forward and backward paths. By performing this reciprocation a plurality of times, it is possible to obtain measurement results on the forward and backward paths at the same position. This makes it possible to measure the surface shape of the entire sample while effectively preventing a rapid change in the relative speed of the probe.

The probe may be relatively moved in the same position on the surface of the sample before and after the relative movement direction is switched by the reciprocation control unit. In this case, during switching of the relative movement direction by the reciprocation control unit, the probe may be gradually relatively moved in the second direction and then gradually relatively moved in the direction opposite to the second direction by the shifting control unit.

With such a configuration, when the relative reciprocation of the probe is continuously performed at the same position on the forward and backward paths, during switching of the relative movement direction, the probe is gradually moved in the second direction, and is then gradually moved in the direction opposite to the second direction so that the probe can be returned to the original position. This makes it possible to effectively prevent a rapid change in the relative speed of the probe even when the relative reciprocation of the probe is continuously performed at the same position on the forward and backward paths.

While the probe is relatively moved in the first direction and relatively moved in the direction opposite to the first direction by the reciprocation control unit, an operation may be repeated to gradually relatively move the probe in the second direction and then gradually relatively move the probe in the direction opposite to the second direction by the shifting control unit. In this case, by being reciprocated a plurality of times by the reciprocation control unit, the probe may be relatively moved at the same position on the sample surface along the first direction and the direction opposite to the first direction.

With such a configuration, at the time of reciprocation, the probe is not relatively moved on a straight line along the first direction, but an operation is repeated to gradually relatively move the probe in the second direction and then gradually relatively move the probe in the opposite direction, so that the probe is relatively moved across a plurality of lines. By performing such reciprocation a plurality of times, it is possible to obtain measurement results on the forward and backward paths at the same position, and thereby to measure the surface shape of the entire sample while effectively preventing a rapid change in the relative speed of the probe.

According to the present invention, the occurrence of periodic noise can be prevented even when the relative speed of the probe is increased, so that the relative speed of the probe can be increased and noise is unlikely to occur in the measurement result for the surface shape of the sample.

MODE FOR CARRYING OUT THE INVENTION

Figure 1:
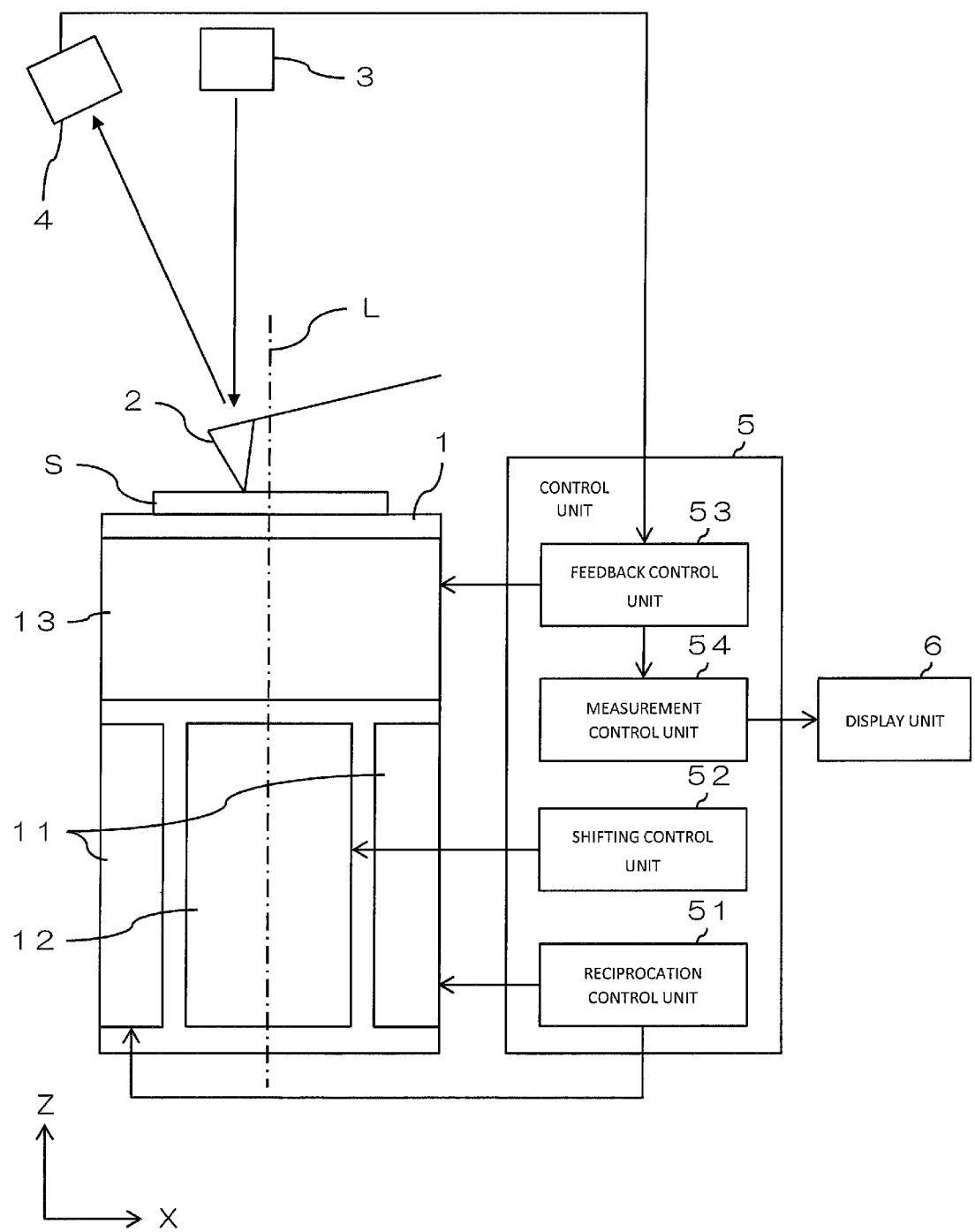
FIG. 1 is a schematic view showing a configuration example of a scanning probe microscope according to an embodiment of the present invention.

FIG. 1 is a schematic view showing a configuration example of a scanning probe microscope according to an embodiment of the present invention. This scanning probe microscope is, for example, an atomic force microscope (AFM), and relatively moves a probe 2 in an XY-plane (a plane orthogonal to the paper surface of FIG. 1) with respect to the surface of a sample S placed on the stage 1. Interatomic force acting between the probe 2 and the surface of the sample S thus changes during the scanning. The probe 2 is made of, for example, a cantilever supported in a cantilever manner, and the distal end on the free end side contacts the surface of the sample S.

The stage 1 is, for example, a columnar member, and the sample S is mounted on the end surface thereof. A first piezoelectric element 11, a second piezoelectric element 12, and a third piezoelectric element 13 are attached to the outer peripheral surface of the stage 1. Each of piezoelectric elements 11, 12, 13 is transformed by being applied with a voltage, and the position of the sample S on the stage 1 changes due to transformation of the stage 1 accompanying the transformation. This enables relative movement of the probe 2 along the surface of the sample S.

The first piezoelectric elements 11 are provided one by one at positions facing the X direction across a center axis L of the stage 1. The second piezoelectric elements 12 are provided one by one at positions facing the Y direction orthogonal to the X direction across the center axis L of the stage 1. That is, the direction (X direction) in which the pair of first piezoelectric elements 11 are arranged and the direction (Y direction) in which the pair of second piezoelectric elements 12 are arranged are orthogonal to each other. The third piezoelectric element 13 is annularly provided on the outer peripheral surface of the stage 1.

Thus, changing the voltage applied to the pair of first piezoelectric elements 11 allows transformation of the stage 1 in the X direction or the direction opposite to the X direction, and scanning of the probe 2 along the surface of the sample S on the stage 1 in the X direction or the direction opposite to the X direction. Further, changing the voltage applied to the pair of second piezoelectric elements 12 allows transformation of the stage 1 in the Y direction or the direction opposite to the Y direction, and scanning of the probe 2 along the surface of the sample S on the stage 1 in the Y direction or the direction opposite to the Y direction. When the stage 1 is moved in the Z direction or the direction opposite to the Z direction, the voltage applied to the third piezoelectric element 13 may be changed.

The probe 2 is irradiated with laser light or the like from a light emitting unit 3, the probe 2 being relatively moved on the surface of the sample S in accordance with the transformation of the stage 1 as thus described. Reflected light from the probe 2 is received by the light receiving unit 4. When the probe 2 is relatively moved along the unevenness of the surface of the sample S, the probe 2 bends in accordance with the shape of the unevenness, and the position at which the reflected light from the probe 2 is received by the light receiving unit 4 changes. It is thus possible to detect a change in interatomic force acting between the probe 2 and the surface of the sample S during the scanning based on a change in light receiving position of the reflected light in the light receiving unit 4.

The operation of the scanning probe microscope is controlled by a control unit 5 including a CPU (Central Processing Unit), for example. The control unit 5 functions as a reciprocation control unit 51, a shifting control unit 52, a feedback control unit 53, a measurement control unit 54, or the like by the CPU executing a program.

The reciprocation control unit 51 controls a voltage applied to the first piezoelectric element 11. The probe 2 is relatively moved in the X direction and the direction opposite to the X direction with respect to the surface of the sample S under control of the reciprocation control unit 51, to allow relative reciprocation of the probe 2 with respect to the surface of the sample S. Hence the probe 2 is scanned with respect to the surface of the sample S in a direction parallel to the X direction.

The shifting control unit 52 controls the voltage applied to the second piezoelectric element 11. The probe 2 is relatively moved in the Y direction with respect to the surface of the sample S under control of the shifting control unit 52, to allow relative shifting of the probe 2 with respect to the surface of the sample S. Hence the probe 2 is scanned with respect to the surface of the sample S in a direction parallel to the Y direction.

The feedback control unit 53 controls the voltage applied to the third piezoelectric element 13 based on the light receiving position of the reflected light at the light receiving unit 4. Specifically, the feedback control unit 53 changes the voltage applied to the third piezoelectric element 13 such that the light receiving position of the reflected light in the light receiving unit 4 is kept at a fixed position, namely, interatomic force acting between the probe 2 and the surface of the sample S becomes constant and the probe 2 is not transformed. Thus, the stage 1 moves in the Z direction or the direction opposite to the Z direction in accordance with the surface shape of the sample S.

The measurement control unit 54 performs a process of measuring the surface shape of the sample S based on the control by the feedback control unit 53. That is, an uneven image of the surface of the sample S is obtained by measuring the surface shape of the sample S based on a relative displacement amount of the probe 2 in the Z direction and the direction opposite to the Z direction, relatively moved in the XY-plane along the surface of the sample S (a displacement amount of the stage 1 in the Z direction and the direction opposite to the Z direction with respect to the surface of the sample S). The measurement control unit 54 causes the display unit 6 which is made up, for example, of a liquid crystal display to display the acquired uneven image of the surface of the sample S.

Figure 2:
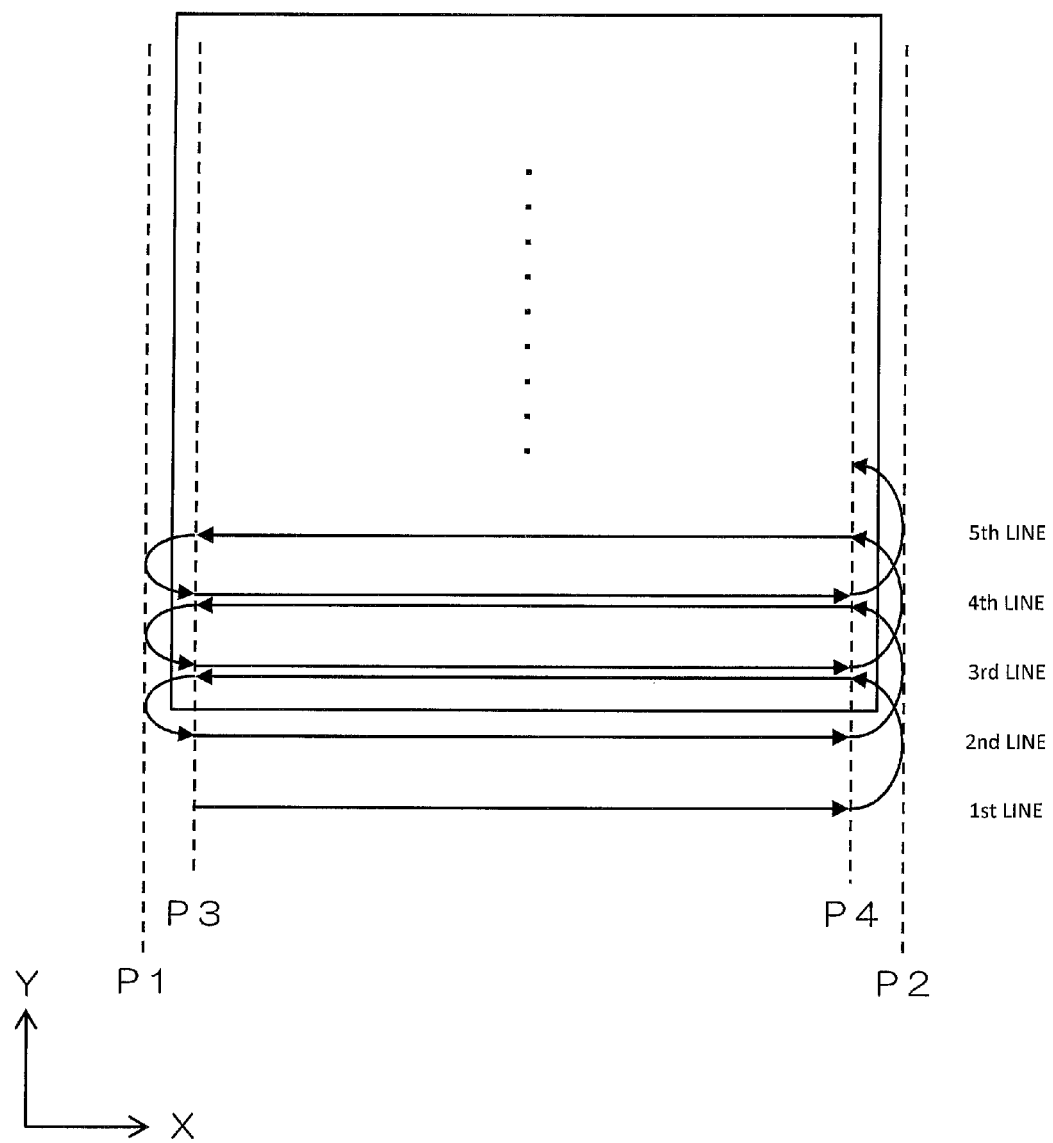
FIG. 2 is a schematic view for describing a first mode at the time of relatively moving a probe on the surface of a sample.
Figure 3A:
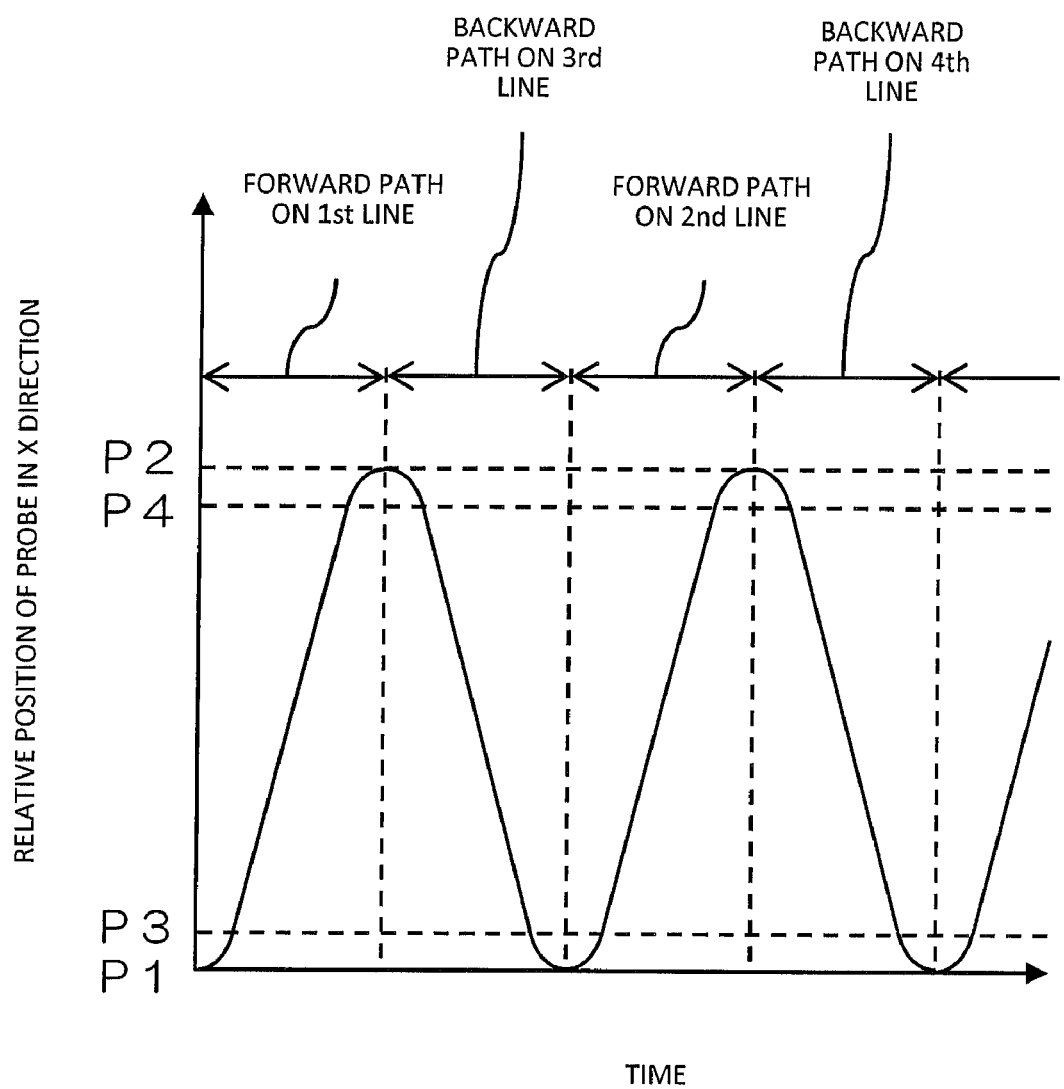
FIG. 3A is a diagram showing the relationship between the time and the relative position of the probe when the probe is relatively moved in the mode of FIG. 2, and shows the relative position of the probe in the X direction.
Figure 3B:
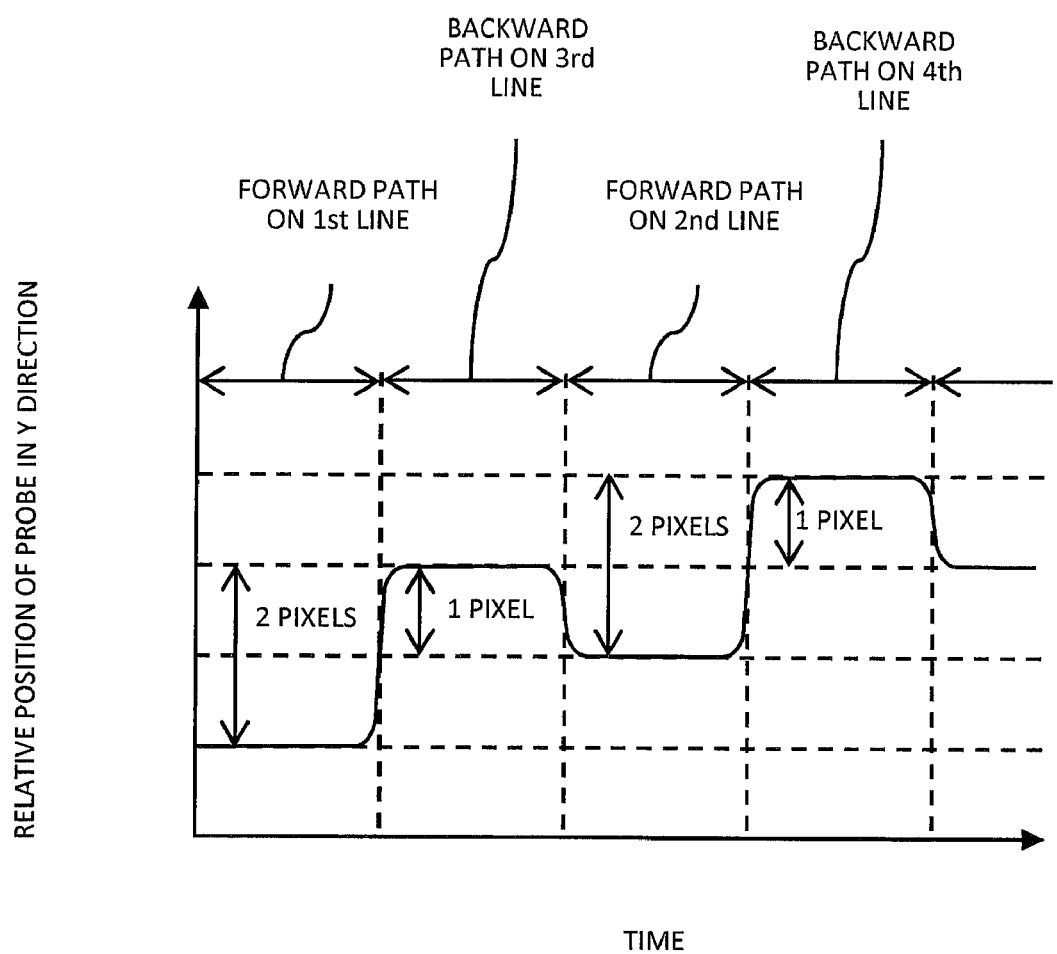
FIG. 3B is a diagram showing the relationship between the time and the relative position of the probe when the probe is relatively moved in the mode of FIG. 2, and shows the relative position of the probe in the Y direction.

FIG. 2 is a schematic view for describing a first mode at the time of relatively moving the probe 2 on the surface of the sample S. FIGS. 3A and 3B are diagrams showing the relationship between the time and the relative position of the probe 2 when the probe 2 is relatively moved in the mode of FIG. 2. FIG. 3A shows the relative position of the probe 2 in the X direction, and FIG. 3B shows the relative position of the probe 2 in the Y direction.

As shown in FIG. 2, when the probe 2 is relatively moved on the surface of the sample S, the following operations are executed in combination: the operation of relatively moving the probe 2 in the X direction (forward path) and the opposite direction (backward path) to the X direction to reciprocate the probe 2; and the operation of relatively moving the probe 2 in the Y direction and the direction opposite to the Y direction to shift the probe 2. In this example, the probe 2 is shifted not only at the starting position P1 of the forward path but also at the return position P2 from the forward path to the backward path.

Specifically, the probe 2 is shifted by two pixels at a time in the Y direction at the return position P2, and shifted by one pixel at a time in the direction opposite to the Y direction every time the probe 2 is returned from the return position P2 to the starting position P1. Since the shift amount differs between the starting position P1 and the return position P2 in this manner, the probe 2 is relatively moved at different positions (on different lines) on the surface of the sample S before and after the relative movement direction of the probe 2 is switched to the X direction or the direction opposite to the X direction at the starting position P1 and the return position P2. Hence the probe 2 is not reciprocated on one line but reciprocated across a plurality of lines.

By repetition of the reciprocation and the shift as described above, on the third and subsequent lines, the probe 2 is relatively moved at the same position (on the same line) on the surface of the sample S along the X direction and the direction opposite to the X direction, as shown in FIG. 2. That is, the relative reciprocation of the probe 2 is not continuously performed at the same position on the forward and backward paths, but is performed at different positions on the forward and backward paths, and measurement results on the forward and backward paths at the same position can be obtained by performing the reciprocation a plurality of times.

In this example, an uneven image of the surface of the sample S is displayed on the display unit 6 based on measurement results on the third and subsequent lines from which the measurement results on the forward and backward paths at the same position are obtained. At this time, interatomic force during the reciprocation is detected, and the feedback amount by the feedback control unit 53 is adjusted using the interatomic force detected in each of the forward and backward paths, to measure the entire surface shape of the sample S.

However, when the adjustment of the feedback amount using the measurement results on the forward and backward paths as described above is not performed, the probe 2 may be shifted at the starting position P1 and the return position P2 so as to obtain only one measurement result either in the forward or backward path for each line. In this case, it is possible to improve the measurement speed of the surface shape of the sample S as compared with a configuration using measurement results on both forward and backward paths for each line.

As shown in FIG. 3A, at the time of reciprocation of the probe 2 in the X direction and the direction opposite to the X direction, when the relative movement direction of the probe 2 is switched at the starting position P1 and the return position P2, the relative speed is gradually decreased and the relative movement direction is then switched, and after the switching, the relative speed is gradually increased. Specifically, the relative speed of the probe 2 is gradually increased from the starting position P1 in the X direction, and then the relative speed is kept constant just for a fixed period of time. Thereafter, the relative speed is gradually decreased, and then the relative movement direction is switched to the direction opposite to the X direction at the return position P2. After the relative speed of the probe 2 is gradually increased from the return position P2 in the direction opposite to the X direction, the relative speed is kept constant just for a fixed period of time. Thereafter, the relative speed is gradually decreased and then the relative movement direction is switched to the X direction at the starting position P1.

Further, as shown in FIG. 3B, at the time of shifting the probe 2 in the Y direction and the direction opposite to the Y direction, the relative speed of the probe 2 is gradually increased, and then the relative speed is gradually decreased. Specifically, the relative speed of the probe 2 is gradually increased at the return position P2 in the Y direction, and then the relative speed is gradually decreased, to shift the probe 2 by two pixels at a time. At the starting position P1, the relative speed of the probe 2 is gradually increased in the direction opposite to the Y direction, and then the relative speed is gradually decreased, to shift the probe 2 by one pixel at a time.

By repeating the reciprocation and the shift as described above, it is possible to prevent the relative speed of the probe 2 from becoming discontinuous when the relative movement direction of the probe 2 is switched at the time of reciprocation or when the probe 2 is shifted. That is, when the relative movement direction of the probe 2 is switched at the time of reciprocation, it is possible to prevent a rapid change in the relative speed of the probe 2 by gradually decreasing the relative speed and then switching the relative movement direction of the probe 2 and by gradually increasing the relative speed after the switching. Further, at the time of shifting, it is possible to prevent a rapid change in the relative speed of the probe 2 by gradually increasing the relative speed of the probe 2 and then gradually decreasing the relative speed. This makes it possible to prevent occurrence of periodic noise even when the relative speed of the probe 2 is increased, so that the relative speed of the probe 2 can be increased and noise is unlikely to occur in a measurement result for the surface shape of the sample S.

Further, at the time of reciprocation, the probe 2 is relatively moved at a fixed speed before the relative speed of the probe 2 is gradually decreased. Thus, the surface shape of the sample S can be accurately measured during relative movement of the probe 2 at the fixed speed. In this example, an uneven image of the surface of the sample S is displayed on the display unit 6 based only on a measurement result that is obtained during relative movement of the probe 2 at the fixed speed.

That is, the uneven image of the surface of the sample S is displayed on the display unit 6 based only on the measurement result between the position P3 and the position P4 where the probe 2 is relatively moving at the fixed speed, out of the measurement results between the starting position P1 and the return position P2. Therefore, even when the relative speed of the probe 2 is increased, noise is unlikely to occur in the measurement result for the surface shape of the sample S, and a highly accurate measurement result can be obtained. Based only on the obtained highly accurate measurement, the uneven image of the surface of the sample S can be displayed on the display unit 6. The fixed speed may be the same speed or different speeds on the forward and backward paths.

Figure 4:
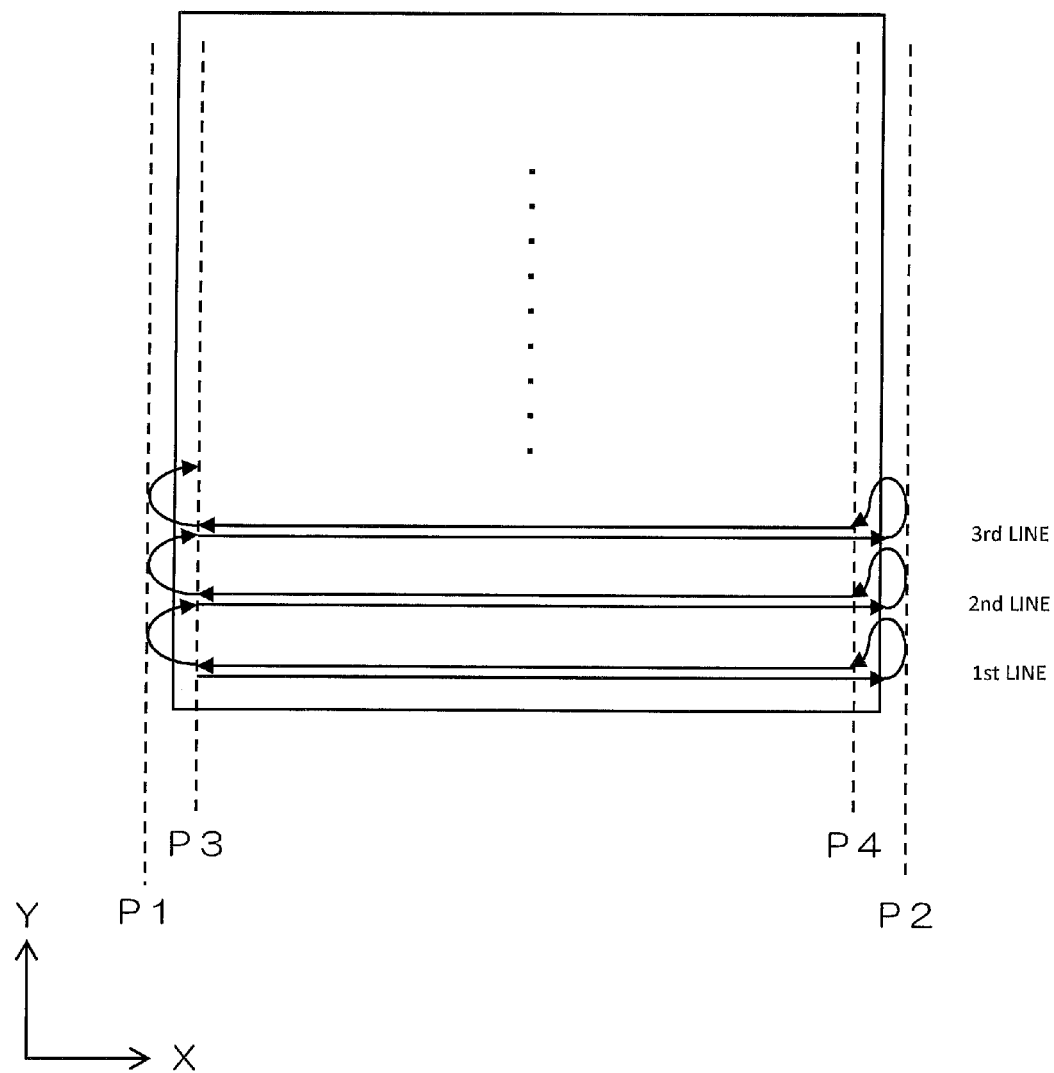
FIG. 4 is a schematic view for describing a second mode of relative movement of a probe on the surface of a sample.
Figure 5A:
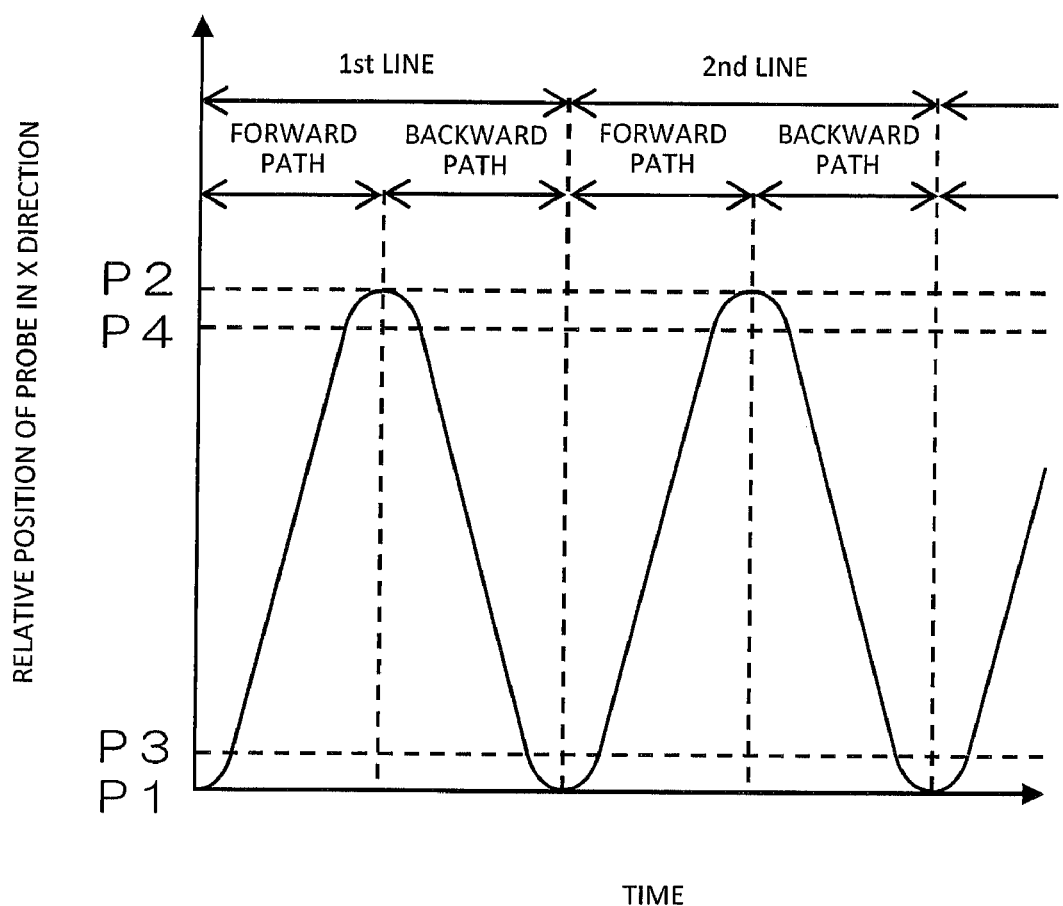
FIG. 5A is a diagram showing the relationship between the time and the relative position of the probe when the probe is relatively moved in the mode of FIG. 4, and shows the relative position of the probe in the X direction.
Figure 5B:
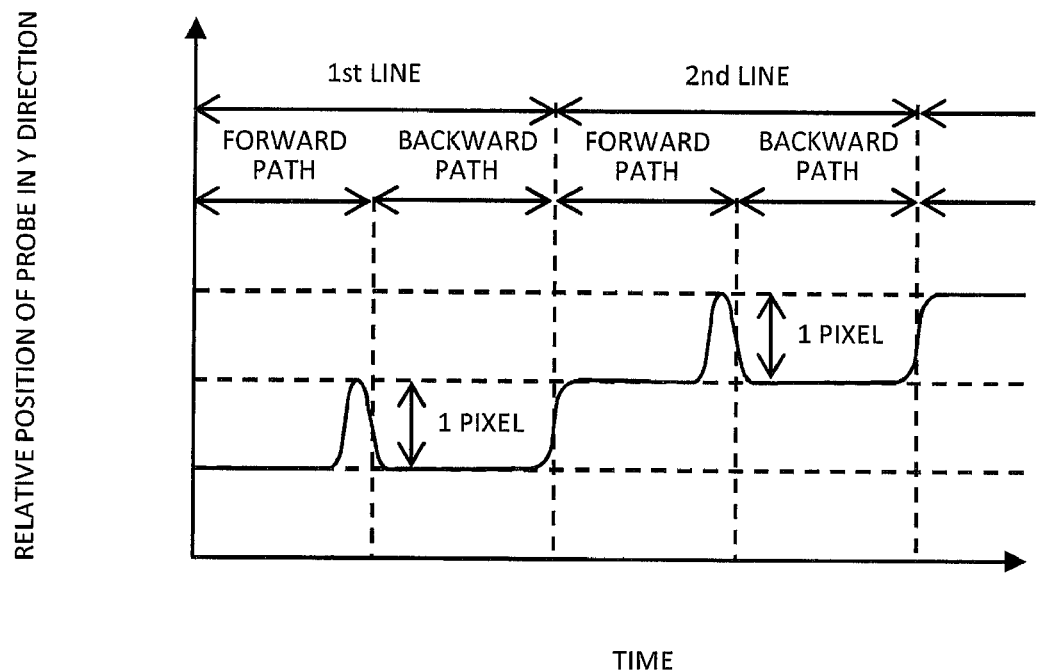
FIG. 5B is a diagram showing the relationship between the time and the relative position of the probe when the probe is relatively moved in the mode of FIG. 4, and shows the relative position of the probe in the Y direction.

FIG. 4 is a schematic diagram for describing a second mode when the probe 2 is relatively moved on the surface of the sample S. FIGS. 5A and 5B are diagrams showing the relationship between the time and the relative position of the probe 2 when the probe 2 is relatively moved in the mode of FIG. 4. FIG. 5A shows the relative position of the probe 2 in the X direction, and FIG. 5B shows the relative position of the probe 2 in the Y direction.

As shown in FIG. 4, when the probe 2 is relatively moved on the surface of the sample S, the following operations are executed in combination: the operation of relatively moving the probe 2 in the X direction (forward path) and the opposite direction (backward path) to the X direction to reciprocate the probe 2; and the operation of relatively moving the probe 2 in the Y direction and the direction opposite to the Y direction to shift the probe 2. In this example, the probe 2 is shifted not only at the starting position P1 of the forward path but also at the return position P2 from the forward path to the backward path.

Specifically, during switching of the relative movement direction of the probe 2 from the X direction to the opposite direction at the return position P2, the probe 2 is gradually relatively moved in the Y direction and then gradually relatively moved in the direction opposite to the Y direction, to be returned to the original line. Thereby, the probe 2 is relatively moved at the same position (on the same line) on the surface of the sample S before and after the relative movement direction is switched from the X direction to the opposite direction at the return position P2.

Every time the probe 2 is returned from the return position P2 to the starting position P1, the probe 2 is shifted by one pixel at a time in the Y direction. An uneven image of the surface of the sample S is displayed on the display unit 6 based on the measurement results on the forward and backward paths obtained for each line in this manner. At this time, interatomic force during the reciprocation is detected, and the feedback amount by the feedback control unit 53 is adjusted using the interatomic force detected in each of the forward and backward paths, to measure the entire surface shape of the sample S.

As shown in FIG. 5A, at the time of reciprocation of the probe 2 in the X direction and the direction opposite to the X direction, when the relative movement direction of the probe 2 is switched at the starting position P1 and the return position P2, the relative speed is gradually decreased and the relative movement direction is then switched, and after the switching, the relative speed is gradually increased. Specifically, the relative speed of the probe 2 is gradually increased from the starting position P1 in the X direction, and then the relative speed is kept constant just for a fixed period of time. Thereafter, the relative speed is gradually decreased, and then the relative movement direction is switched to the direction opposite to the X direction at the return position P2. After the relative speed of the probe 2 is gradually increased from the return position P2 in the direction opposite to the X direction, the relative speed is kept constant just for a fixed period of time. Thereafter, the relative speed is gradually decreased and then the relative movement direction is switched to the X direction at the starting position P1.

Further, as shown in FIG. 5B, at the time of shifting the probe 2 in the Y direction and the direction opposite to the Y direction, the relative speed of the probe 2 is gradually increased, and then the relative speed is gradually decreased. Specifically, the relative speed of the probe 2 is gradually increased at the return position P2 in the Y direction, and then the relative speed is gradually decreased. Thereafter, the relative speed is gradually increased in the direction opposite to the Y direction, and then the relative speed is gradually decreased again, to return the position of the probe 2 to the original line. At the starting position P1, the relative speed of the probe 2 is gradually increased in the Y direction, and then the relative speed is gradually decreased, to shift the probe 2 by one pixel at a time.

By repeating the reciprocation and the shift as described above, it is possible to prevent the relative speed of the probe 2 from becoming discontinuous when the relative movement direction of the probe 2 is switched at the time of reciprocation or when the probe 2 is shifted. Therefore, even in the modes shown in FIGS. 4, 5A, and 5B, it is possible to prevent occurrence of periodic noise when the relative speed of the probe 2 is increased, so that the relative speed of the probe 2 can be increased and noise is unlikely to occur in the measurement result for the surface shape of the sample S.

Especially in this example, when the relative reciprocation of the probe 2 is continuously performed at the same position (on the same line) on the forward and backward paths, during switching of the relative movement direction, the probe 2 is gradually moved in the Y direction and then gradually moved in the opposite direction so that it can be returned to the original position. This makes it possible to effectively prevent a rapid change in the relative speed of the probe 2 even when the relative reciprocation of the probe 2 is continuously performed at the same position on the forward and backward paths.

Further, at the time of reciprocation, the probe 2 is relatively moved at a fixed speed before the relative speed of the probe 2 is gradually decreased. Thus, the surface shape of the sample S can be accurately measured during relative movement of the probe 2 at the fixed speed. In this example, an uneven image of the surface of the sample S is displayed on the display unit 6 based only on a measurement result that is obtained during relative movement of the probe 2 at the fixed speed.

That is, the uneven image of the surface of the sample S is displayed on the display unit 6 based only on the measurement result between the position P3 and the position P4 where the probe 2 is relatively moving at the fixed speed, out of the measurement results between the starting position P1 and the return position P2. Therefore, even when the relative speed of the probe 2 is increased, noise is unlikely to occur in the measurement result for the surface shape of the sample S, and a highly accurate measurement result can be obtained. Based only on the obtained highly accurate measurement, the uneven image of the surface of the sample S can be displayed on the display unit 6. The fixed speed may be the same speed or different speeds on the forward and backward paths.

Figure 6:
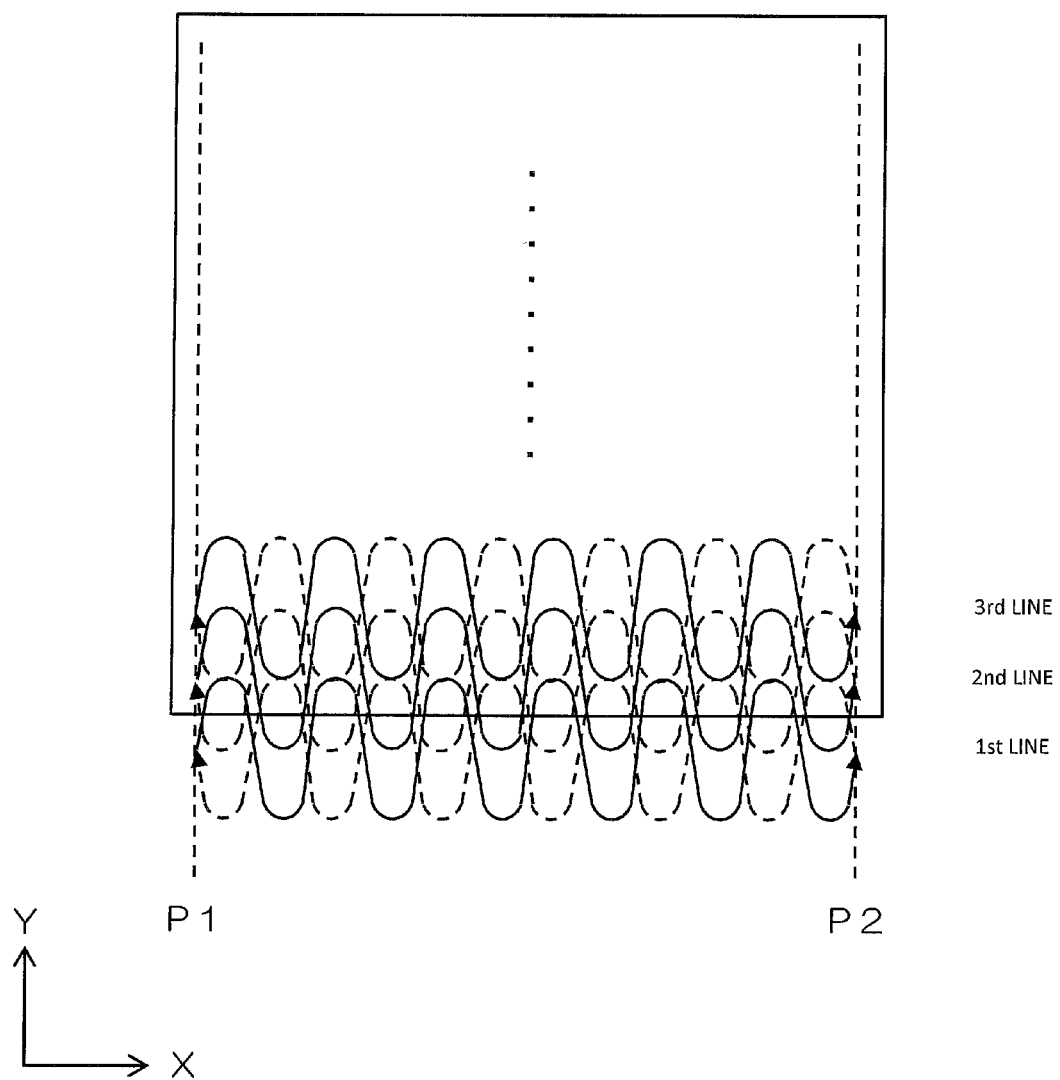
FIG. 6 is a schematic view for describing a third mode when relatively moving the probe on the surface of the sample.
Figure 7A:
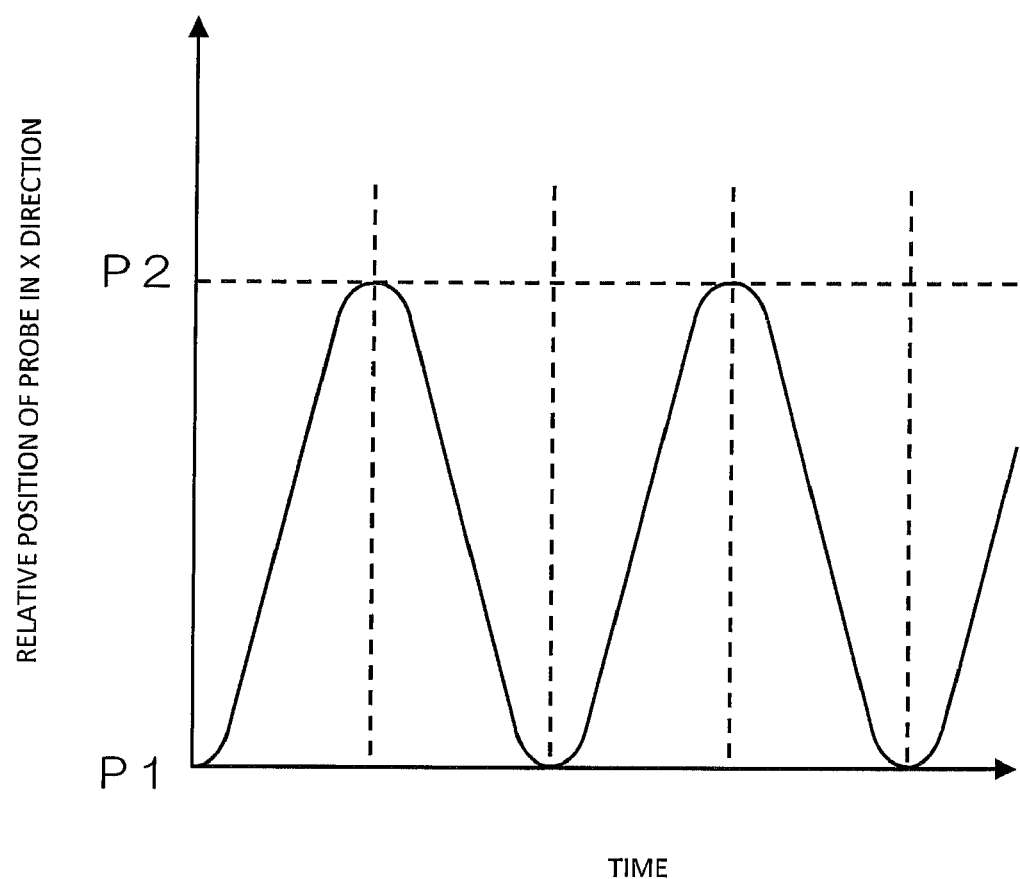
FIG. 7A is a diagram showing the relationship between the time and the relative position of the probe when the probe is relatively moved in the mode of FIG. 6, and shows the relative position of the probe in the X direction.
Figure 7B:
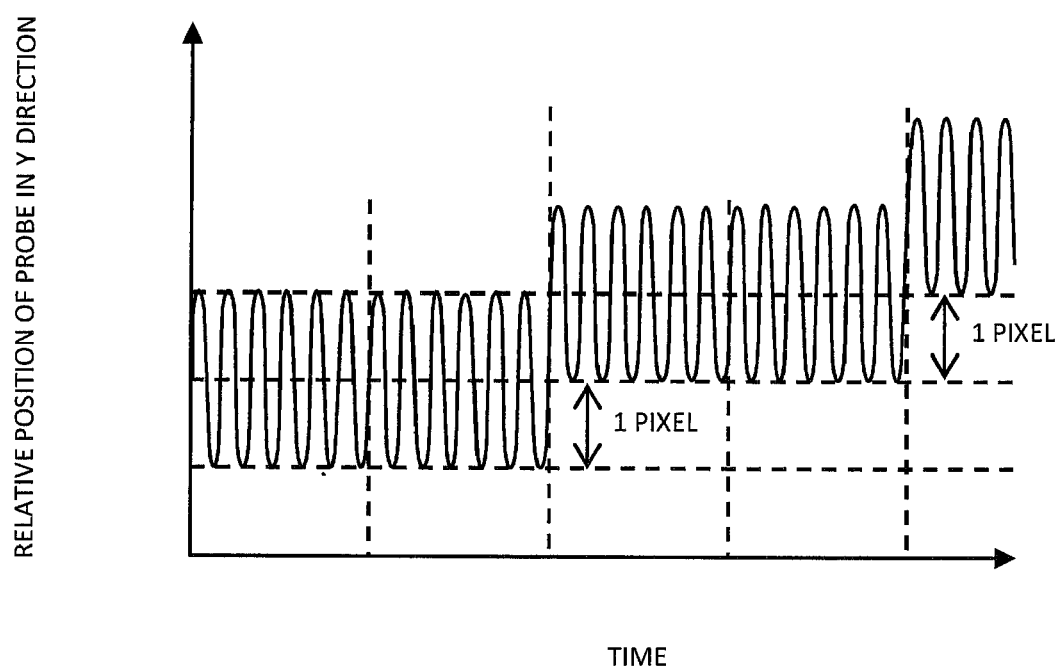
FIG. 7B is a diagram showing the relationship between the time and the relative position of the probe when the probe is relatively moved in the mode of FIG. 6, and shows the relative position of the probe in the Y direction.
Figure 8:
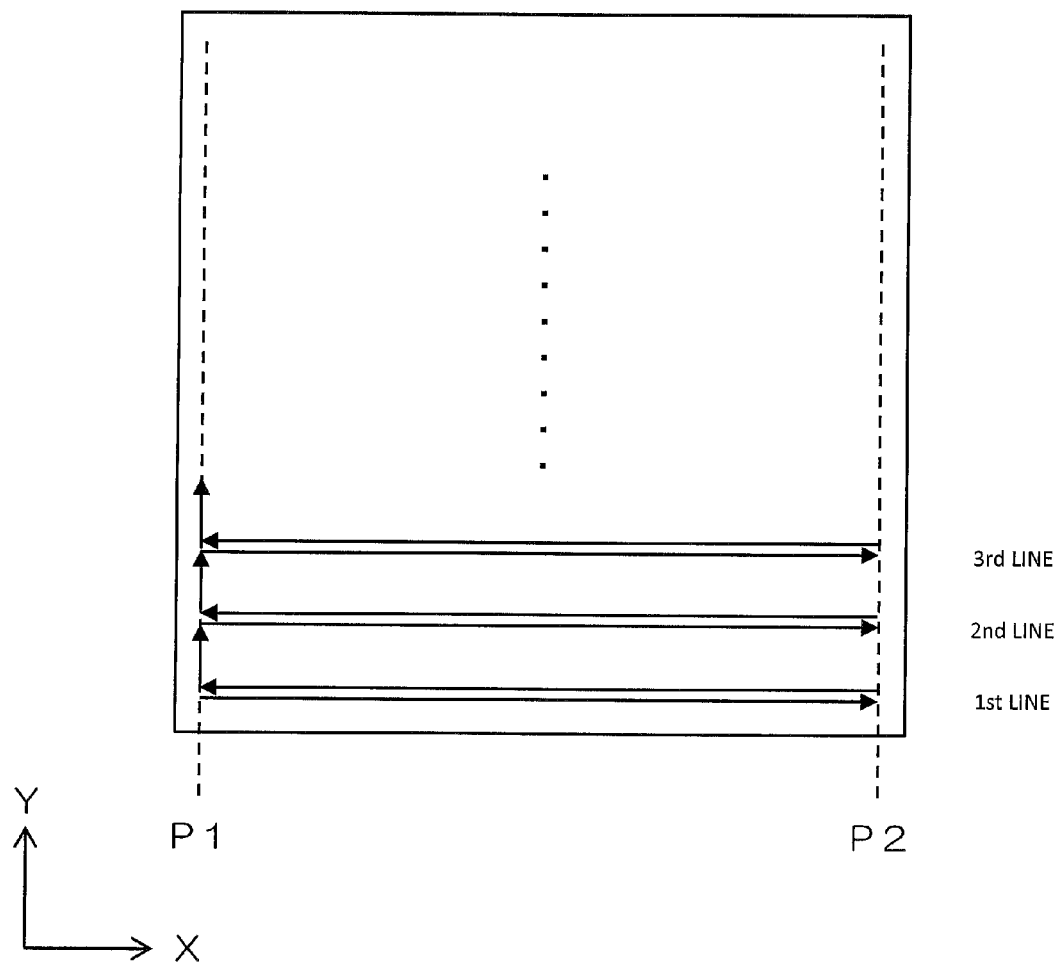
FIG. 8 is a schematic view for describing a conventional mode at the time of relatively moving a probe on the surface of a sample.
Figure 9A:
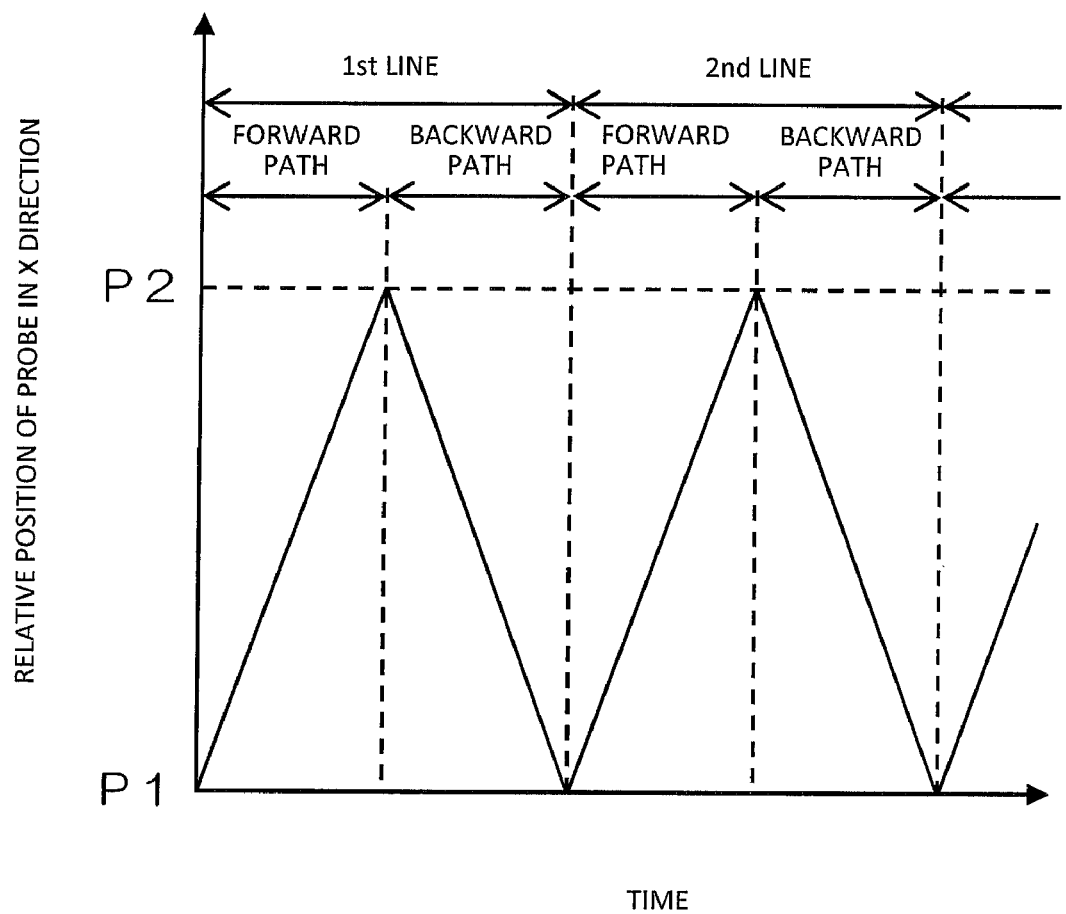
FIG. 9A is a diagram showing the relationship between the time and the relative position of the probe when the probe is relatively moved in the mode of FIG. 8, and shows the relative position of the probe in the X direction.
Figure 9B:
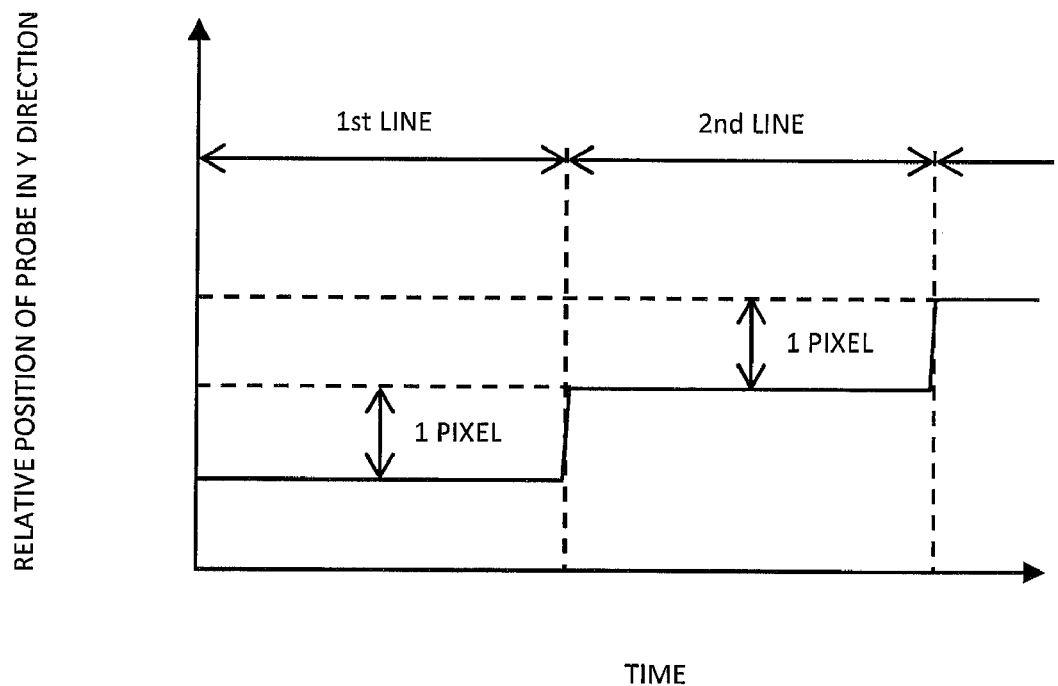
FIG. 9B is a diagram showing the relationship between the time and the relative position of the probe when the probe is relatively moved in the mode of FIG. 8, and shows the relative position of the probe in the Y direction.

FIG. 6 is a schematic diagram for describing a third mode when the probe 2 is relatively moved on the surface of the sample S. FIGS. 7A and 7B are diagrams showing the relationship between the time and the relative position of the probe 2 when the probe 2 is relatively moved in the mode of FIG. 6. FIG. 7A shows the relative position of the probe 2 in the X direction, and FIG. 7B shows the relative position of the probe 2 in the Y direction.

As shown in FIG. 6, when the probe 2 is relatively moved on the surface of the sample S, the following operations are executed in combination: the operation of relatively moving the probe 2 in the X direction (forward path) and the opposite direction (backward path) to the X direction to reciprocate the probe 2; and the operation of relatively moving the probe 2 in the Y direction and the direction opposite to the Y direction to shift the probe 2. In this example, the probe 2 is shifted not only at the starting position P1 of the forward path and the return position P2 from the forward path to the backward path, but is always shifted during the reciprocation.

Specifically, the probe 2 is not relatively moved on a straight line along the X direction, but is repeatedly shifted in a Y direction and the direction opposite to the Y direction in a fixed period with an amplitude of two pixels, to be reciprocated in the X direction and the direction opposite to the X direction while being shifted across three lines. Then, every time the probe 2 is returned from the return position P2 to the starting position P1, the probe 2 is shifted by one pixel at a time in the Y direction.

In FIG. 6, the forward path is indicated by a solid line and the backward path is indicated by a broken line. In addition, in FIGS. 6 and 7B, in order to facilitate the description, the cycle in which the probe 2 is repeatedly shifted in the Y direction and the direction opposite to the Y direction is shown larger than the actual cycle.

By repetition of the reciprocation and the shift as described above, on the second and subsequent lines, the probe 2 is relatively moved at the same position (on the same line) on the surface of the sample S along the X direction and the direction opposite to the X direction, as shown in FIG. 6. That is, if the cycle in which the probe 2 is repeatedly shifted in the Y direction and the direction opposite to the Y direction is appropriately set, since the positions through which the probe 2 passes on the same line periodically overlap each other on the forward and backward paths, it is possible to obtain measurement results on the forward and backward paths at the overlapped same position.

In this example, an uneven image of the surface of the sample S is displayed on the display unit 6 based on the measurement results on the second and subsequent lines from which measurement results on the forward and backward paths at the same position are obtained. At this time, interatomic force during the reciprocation is detected, and the feedback amount by the feedback control unit 53 is adjusted using the interatomic force detected in each of the forward and backward paths, to measure the entire surface shape of the sample S.

As shown in FIG. 7A, at the time of reciprocation of the probe 2 in the X direction and the direction opposite to the X direction, when the relative movement direction of the probe 2 is switched at the starting position P1 and the return position P2, the relative speed is gradually decreased and the relative movement direction is then switched, and after the switching, the relative speed is gradually increased. Specifically, the relative speed of the probe 2 is gradually increased from the starting position P1 in the X direction, and then the relative speed is kept constant just for a fixed period of time. Thereafter, the relative speed is gradually decreased, and then the relative movement direction is switched to the direction opposite to the X direction at the return position P2. After the relative speed of the probe 2 is gradually increased from the return position P2 in the direction opposite to the X direction, the relative speed is kept constant just for a fixed period of time. Thereafter, the relative speed is gradually decreased and then the relative movement direction is switched to the X direction at the starting position P1.

Further, as shown in FIG. 7B, at the time of shifting the probe 2 in the Y direction and the direction opposite to the Y direction, the relative speed of the probe 2 is gradually increased, and then the relative speed is gradually decreased. Specifically, during relative movement of the probe 2 in the X direction and during the relative movement in the direction opposite to the X direction (including a period when the probe 2 is kept at a fixed relative speed), an operation is repeated to gradually relatively move the probe 2 in the Y direction and then relatively move the probe 2 in the direction opposite to the Y direction.

By repeating the reciprocation and the shift as described above, it is possible to prevent the relative speed of the probe 2 from becoming discontinuous when the relative movement direction of the probe 2 is switched at the time of reciprocation or when the probe 2 is shifted. Therefore, even in the modes shown in FIGS. 6, 7A, and 7B, it is possible to prevent occurrence of periodic noise when the relative speed of the probe 2 is increased, so that the relative speed of the probe 2 can be increased and noise is unlikely to occur in the measurement result for the surface shape of the sample S.

In the above embodiment, the description has been given of the mechanism using the piezoelectric elements 11, 12, 13 as the mechanism for relatively moving the probe 2 with respect to the surface of the sample S. Examples of such piezoelectric elements 11, 12, 13 include a tube type piezoelectric element and a laminated piezoelectric element. However, the mechanism for relatively moving the probe 2 with respect to the surface of the sample S is not limited to the piezoelectric elements 11, 12, 13, but the position of the stage 1 with respect to the probe 2 can be changed using any other mechanism. It may be a mechanism for relatively moving the probe 2 with respect to the surface of the sample S by changing the position of the probe 2 with respect to the stage 1, instead of changing the position of the stage 1 with respect to the probe 2.

In the above embodiment, the description has been given of the configuration in which the present invention is applied to the atomic force microscope which is an example of the scanning probe microscope. However, the present invention is applicable not only to the atomic force microscope but also to other scanning probe microscopes such as a scanning tunneling microscope (STM).

The invention claimed is:

1. A scanning probe microscope, comprising:
a probe that is relatively moved along a surface of a sample;
a reciprocation control unit that relatively moves the probe in a first direction and a direction opposite to the first direction with respect to the surface of the sample, to reciprocate the probe;
a shifting control unit that relatively moves the probe in a second direction orthogonal to the first direction with respect to the surface of the sample, to shift the probe; and
a measurement control unit that measures a surface shape of the sample based on a relative displacement amount of the probe in a direction orthogonal to the first direction and the second direction, the probe being relatively moved along the surface of the sample by the reciprocation control unit and the shifting control unit,
a display unit,
wherein, when a relative movement direction of the probe is switched between a first direction and a direction opposite to the first direction, in the axis of the first direction, the reciprocation control unit gradually decreases a relative speed and then switches the direction, and gradually increases the relative speed after the switching, to relatively reciprocate the probe, and
the shifting control unit, in the axis of the second direction, gradually increases the relative speed of the probe and then gradually decreases the relative speed, to relatively shift the probe,
wherein the probe is relatively moved at different straight lines on the surface of the sample before and after the relative movement direction is switched by the reciprocation control unit, and wherein the probe is relatively reciprocated a plurality of times by the reciprocation control unit, to be relatively moved in the first direction and in the direction opposite to the first direction at the same straight line on the surface of the sample, wherein the reciprocation control unit relatively moves the probe at a fixed speed before gradually decreasing the relative speed of the probe, wherein the measurement control unit causes a display unit to display an uneven image of the sample surface based only on a measurement result that is obtained during relative movement of the probe at the fixed speed.

2. A scanning probe microscope, comprising:

a probe that is relatively moved along a surface of a sample;

a reciprocation control unit that relatively moves the probe in a first direction and a direction opposite to the first direction with respect to the surface of the sample, to reciprocate the probe;

a shifting control unit that relatively moves the probe in a second direction orthogonal to the first direction with respect to the surface of the sample, to shift the probe; and a measurement control unit that measures a surface shape of the sample based on a relative displacement amount of the probe in a direction orthogonal to the first direction and the second direction, the probe being relatively moved along the surface of the sample by the reciprocation control unit and the shifting control unit, a display unit, wherein, when a relative movement direction of the probe is switched between a first direction and a direction opposite to the first direction, in the axis of the first direction, the reciprocation control unit gradually decreases a relative speed and then switches the direction, and gradually increases the relative speed after the switching, to relatively reciprocate the probe, and the shifting control unit, in the axis of the second direction, gradually increases the relative speed of the probe and then gradually decreases the relative speed, to relatively shift the probe, wherein the probe is relatively moved at the same straight line on the surface of the sample before and after the relative movement direction is switched by the reciprocation control unit, and wherein, while the relative movement direction is switched by the reciprocation control unit, the probe is gradually relatively moved in the second direction and then gradually relatively moved in the direction opposite to the second direction by the shifting control unit, wherein the reciprocation control unit relatively moves the probe at a fixed speed before gradually decreasing the relative speed of the probe, wherein the measurement control unit causes a display unit to display an uneven image of the sample surface based only on a measurement result that is obtained during relative movement of the probe at the fixed speed.

3. A scanning probe microscope, comprising:

a probe that is relatively moved along a surface of a sample;

a reciprocation control unit that relatively moves the probe in a first direction and a direction opposite to the first direction with respect to the surface of the sample, to reciprocate the probe;

a shifting control unit that relatively moves the probe in a second direction orthogonal to the first direction with respect to the surface of the sample, to shift the probe; and a measurement control unit that measures a surface shape of the sample based on a relative displacement amount of the probe in a direction orthogonal to the first direction and the second direction, the probe being relatively moved along the surface of the sample by the reciprocation control unit and the shifting control unit, a display unit, wherein, when a relative movement direction of the probe is switched between a first direction and a direction opposite to the first direction, in the axis of the first direction, the reciprocation control unit gradually decreases a relative speed and then switches the direction, and gradually increases the relative speed after the switching, to relatively reciprocate the probe, and the shifting control unit, in the axis of the second direction, gradually increases the relative speed of the probe and then gradually decreases the relative speed, to relatively shift the probe, wherein, while the probe is relatively moved in the first direction on a straight line and relatively moved in the direction opposite to the first direction on the straight line by the reciprocation control unit, an operation is repeated a plurality of times for each straight line to gradually relatively move the probe in the second direction and then gradually relatively move the probe in the direction opposite to the second direction by the shifting control unit, and wherein the probe is relatively reciprocated a plurality of times by the reciprocation control unit, to be relatively moved along the first direction and the direction opposite to the first direction at the same position on the surface of the sample, wherein the reciprocation control unit relatively moves the probe at a fixed speed before gradually decreasing the relative speed of the probe, wherein the measurement control unit causes a display unit to display an uneven image of the sample surface based only on a measurement result that is obtained during relative movement of the probe at the fixed speed.

* * * * *